United States Patent [19]
Mocker et al.

[11] Patent Number: 5,208,641
[45] Date of Patent: May 4, 1993

[54] LASER CAVITY HELMET MOUNTED SIGHT

[75] Inventors: Hans W. Mocker, Minneapolis; John E. Overland, Plymouth, both of Minn.

[73] Assignee: Honeywell Inc., Minneapolis, Minn.

[21] Appl. No.: 845,879

[22] Filed: Mar. 3, 1992

Related U.S. Application Data

[63] Continuation of Ser. No. 589,714, Sep. 28, 1990, abandoned.

[51] Int. Cl.$^5$ .................. G01C 3/08; G01B 11/26; G01J 1/20
[52] U.S. Cl. .................. 356/5; 250/203.2; 250/206.2; 356/28.5; 356/141; 356/152
[58] Field of Search .................. 356/5, 28.5, 141, 152; 250/203.2, 206.2

[56] References Cited

U.S. PATENT DOCUMENTS

| | | |
|---|---|---|
| 3,375,375 | 3/1968 | Abbey et al. |
| 3,443,872 | 5/1969 | Colvin et al. |
| 3,809,477 | 5/1974 | Russell ........................ 356/141 |
| 3,917,412 | 11/1975 | Stoutmeyer et al. ........ 356/152 |
| 4,053,233 | 10/1977 | Bien et al. .................. 356/141 |
| 4,111,555 | 9/1978 | Ellis . |
| 4,167,329 | 9/1979 | Jelalian et al. .............. 356/5 |
| 4,193,689 | 3/1980 | Reymond et al. |
| 4,209,254 | 6/1980 | Reymond et al. |
| 4,315,240 | 2/1982 | Spooner . |
| 4,315,241 | 2/1982 | Spooner . |
| 4,315,690 | 2/1982 | Trocellier et al. |
| 4,574,197 | 3/1986 | Kliever . |
| 4,649,504 | 3/1987 | Krouglicof et al. |
| 4,684,249 | 8/1987 | Ellis . |
| 4,866,229 | 9/1989 | Scharfenberg . |
| 4,884,219 | 11/1989 | Waldren . |
| 4,896,962 | 1/1990 | Menn et al. ............... 356/152 |
| 4,928,152 | 5/1990 | Gerardin .................... 356/5 |

FOREIGN PATENT DOCUMENTS

| | | |
|---|---|---|
| 0235034 | 9/1987 | European Pat. Off. |
| 3601536 | 6/1987 | Fed. Rep. of Germany . |
| 2433760 | 3/1980 | France . |

OTHER PUBLICATIONS

Otaguro et al., "Single-Target Module Orientation Sensor for Space Operations", Oct. 13-16, 1986, pp. 113-123 in the proceedings of the IEEE/AIAA 7th Digital Avioncs Systems Conference at Fort Worth, Tex.

Primary Examiner—Stephen C. Buczinski
Attorney, Agent, or Firm—John G. Shudy, Jr.

[57] ABSTRACT

A laser illuminated helmet mounted sight that determines helmet or sight position from an externally mounted light source. The electronics, including light sources and detectors, are on the helmet. Also, no electrical cables or mechanical linkage is connected to the helmet. The helmet only has passive reflectors for reflecting light beams from a laser source. The return times and directions of the returning light beams processed by off-helmet electronics, result in a position indication of the helmet.

15 Claims, 6 Drawing Sheets

LASER CAVITY HELMET MOUNTED SIGHT

This application is a continuation of application Ser. No. 07/589,714 filed Sept. 28, 1990, now abandoned.

FIELD OF THE INVENTION

The invention relates to a system for non-contact detection of the position and orientation of an object in space. Particularly, the invention relates to a system for monitoring the position and orientation of a pilot's helmet within the cockpit of high performance tactical helicopters. More particularly, the invention relates to a helmet mounted sight.

BACKGROUND OF THE INVENTION

A variety of helmet monitoring systems exist in the art. Some electro-optic devices use rotating mirrors and a conventional light source, depending upon the number of observable helmet mounted sensors. These devices may be used in roll or non-roll applications. Without roll information, the use of the helmet monitoring system is limited to the low G helicopter environment where the pilot can keep his head upright. Accuracy is limited by spot size of the light and the linearity of rotating scan mirrors. Reliability is limited by mechanically moving parts such as the rotating mirrors.

Some magnetic devices exist in the art. For instance, the magnetic helmet sight provides complete X, Y, Z, pitch, roll and your (6-axis) information. Its accuracy is limited by cockpit metal induced distortions of magnetic fields. Since helmet mounted metal is difficult to compensate for, accuracy is significantly reduced in an integrated magnetic helmet sight or display system.

The related art pertaining to helmet sights have light sources located on the helmet and detector configurations (i.e., spatially extended array) mounted in the cockpit. Thus, the employed sources on the helmet must be powered via cables and connectors from the cockpit. These approaches restrict the maneuverability of the pilot and add additional weight to the helmet which is a disadvantage in a high-g maneuver. In addition, logistics problems do exist if the pilot's helmet after mounting needs to be connected by special personnel.

In contrast, the present invention neither the light source (semiconductor laser) nor the detector are mounted to the helmet but are both mounted in the cockpit. Only passive means such as engraved grooves or corner cubes are located at the helmet. This results in the significant advantages over the related art. There is no increase in helmet weight which is important for high-g maneuvers (8-10 g) of modern fighter aircraft. The use of near-infrared laser sources (i.e., InGaAsP laser at 1.54 microns) results in complete eye-safety for the pilot and no light emergence from the cockpit. Sources and detectors can be co-located (i.e., common transmit-receive optics) resulting in a minimum of mounts in the cockpit

SUMMARY OF THE INVENTION

The invention incorporates a groove or grooves or small corner cubes mounted on a helmet in a particular configuration upon which a laser diode or other light source mounted in the cockpit illuminates the corner cubes or grooves. A small amount of light is returned to the light source or laser and affects the level of oscillation in the laser. A small output of the light is coupled to a detector and preamplifier and measured with a spectrum analyzer. A small modulation of the intensity of the light at the beat frequency is observed which is proportional to a range. If the helmet has a velocity then an additional doppler-shifted signal may be obtained that can be isolated from the range-related frequency shift.

Features of the laser cavity helmet mounted sight include the requirement of only one compound lens, having a self-aligning technique, a requirement of only a low frequency modulation of the light source, not requiring a high quality reflector on the helmet, processing at acoustic frequencies using present processors, and, depending on the configuration, requiring only one light source.

DESCRIPTION OF THE PREFERRED EMBODIMENTS

The principle of operation of the external cavity laser for the present helmet mounted sight utilizes a laser diode scheme that is used for position sensing which is the external cavity laser with weak feedback from the target. U.S. Pat. No. 4,919,532, entitled Laser Doppler Velocimeter, invented by Hans Mocker and Paul Bjork, and dated Apr. 24, 1990 is hereby incorporated by reference. The present invention, having the external cavity laser, the laser diode is used as a frequency scannable source and as an optical phase discriminator. Dependent on the phase of the return signal, the diode laser either increases or decreases its level of oscillation, depending on the return signal being in phase or out of phase with the intrinsic signal. For distance measurements, the diode laser is current modulated to make use of the frequency chirp ($1/sec^2$) of semiconductor lasers. If the level of oscillation is monitored through the back mirror of the diode with a detector, a beat frequency is observed which is proportional to range. If the helmet has a velocity, an additional doppler-shifted signal is obtained that can be isolated from the range-related frequency shift. A three mirror laser external cavity has been used for laser frequency stabilization where a line width of 40 kilohertz has been achieved which is four orders of magnitude of improvement over the solitary diode.

Figure 1:
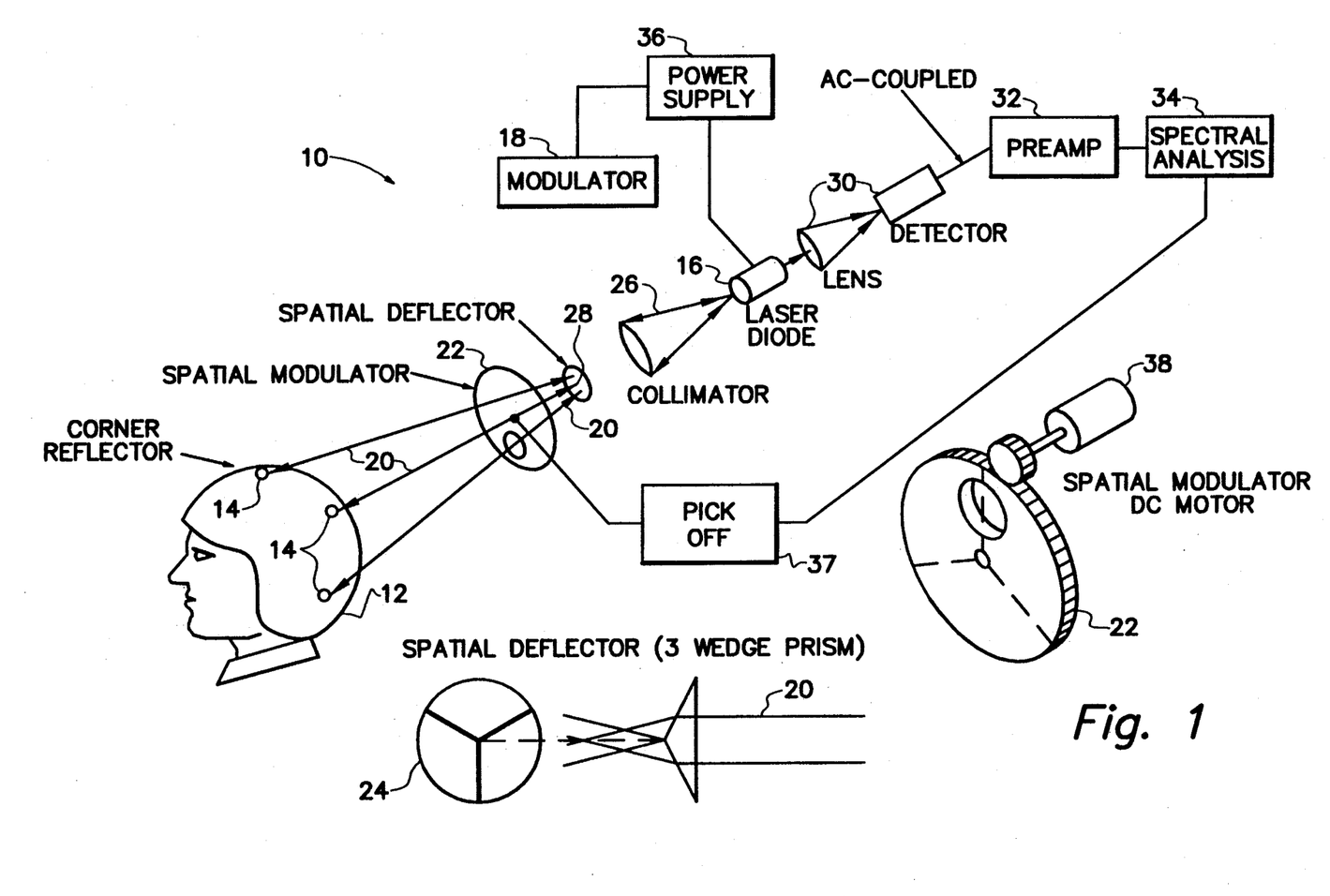
FIG. 1 reveals an embodiment of the invention.

One embodiment of the present invention utilizing an external cavity laser is shown in FIG. 1. A laser diode 16 emits light 20 which is projected towards the pilot's helmet 20. Several optics configurations may be used in embodiment 10. One configuration is referred to the flood light approach which uses the natural (20°×30°) output of diode 16 and illuminates all three corner cubes 14 with light 20. In this approach, either corner cubes 14 are themselves modulated or beam 20 is spatially modulated by spatial modulator 22. Another configuration utilizes a moderate beam spread of light 20, provided by collimator 26 and spatial deflector 28, that uses a three wedge prism 24 to form three beams each of which illuminates one corner cube or reflector 14, respectively. Corner cubes 14 reflect back light 20 onto laser diode 16 which in turn reflects remaining light 20 onto photodetector 30. Photodetector 30 converts reflective light 20 into electrical signals which are AC-coupled to preamplifier 32. Output of preamplifier 32 goes to spectral analysis 34 for range and/or velocity determination of helmet 12. Modulator 18 and power supply 36 effectively provide modulated power to laser diode 16. Spatial modulator 22 is driven by motor 38.

A small amount of the laser light 20 intensity returned into the laser cavity, affects the level of oscillation in diode 20. If laser diode 16 is chirped in frequency by modulating the excitation (as graphed in FIG. 2, which shows measured dependence of laser diode frequency on injection current) a frequency shift of the outgoing beam is obtained in the time-of-flight $\tau=2L/c$ it takes for light emitted to reach the target and be backscattered into laser 20 where the mixing takes place. While modulating the diode 16 current, the laser's free running frequency is tuned and a mode hop occurs at intervals equal to consecutive external cavity modes $c/2L_H$ where $L_H$ is the distance between laser 20 and corner cube 14 on helmet 12. The result is an amplitude modulation at the beat frequency which is given by the equation:

$$v_B = \tau \cdot \frac{dv}{dt} = \frac{2L_H}{c} \cdot \frac{dv}{dt}$$

where $dv/d\tau$ is the chirp rate of the laser.

The small amount of the laser light 20 coupled (through a back mirror) to a detector 30 and preamplifier 32 is measured with a spectrum analyzer 34. A small modulation (i.e., 0.1% in amplitude) of the laser's intensity at the beat frequency is observed with analyzer 34.

An evaluation of the beat frequency to be expected for a given target range and velocity is noted:

$$\text{Beat frequency } v_B = \frac{2v}{\lambda} + \frac{2L_H}{c} \cdot \frac{dv}{dt}$$

where $\Delta v$=target velocity, $\lambda$=laser wavelength, $L_H$=range to helmet, and $dv/dt$=chirp rate of laser diode.

For an application of the above formula utilizing practical values, take a Sharp diode LT 015 MDO having $$\frac{dv}{dt} = 2.6 \times 10^9 \text{ Hz/mA } o\text{-}to\text{-}p.$$

Figure 3:
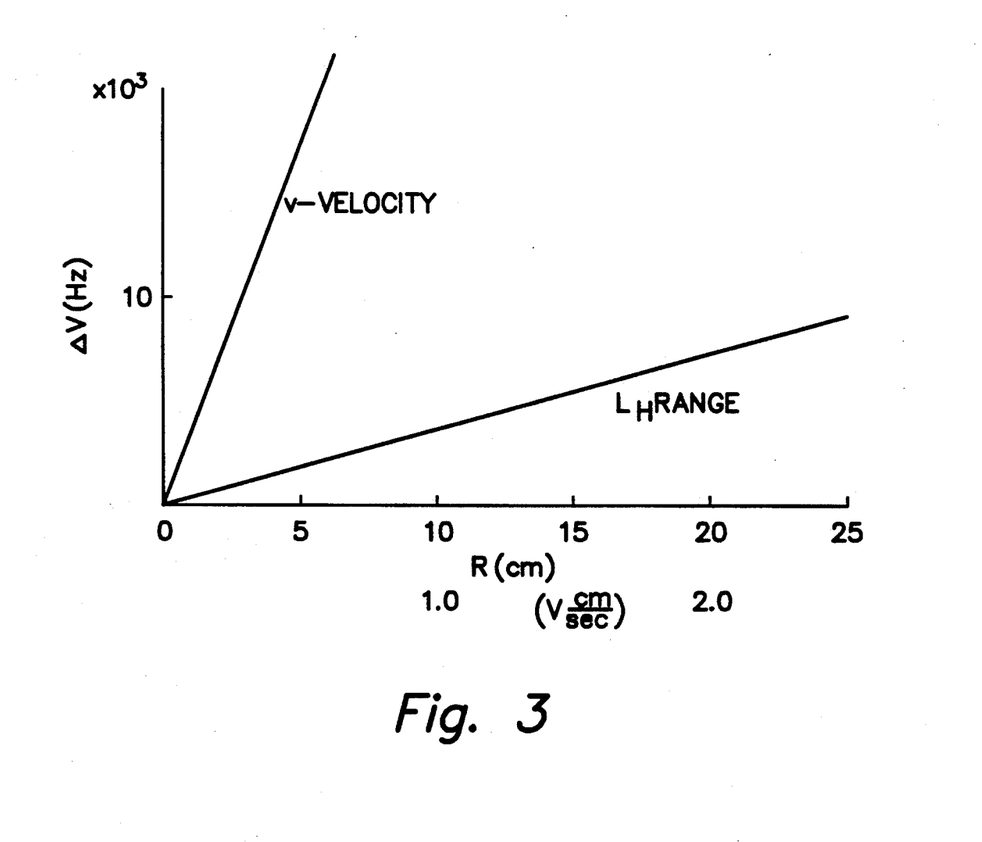
FIG. 3 is a graph of beat frequency versus velocity and range.

For $v=0$ the case of ranging only is $v_B 2L_H/c \cdot dv/dt = K_1 \, L_H$ for a 1 kHz modulated frequency, $K_1=3.46\times10^2$ 1/cmsec for $L_H=20$ cm and $v_B=6.92\times10^3$ Hz. For $dv/dt=0$ (no chirp) the case of velocity only is $v_B=2v/\lambda_0=K_2 v$. For $\lambda_0=0.83\times10^{-4}$ cm., $K_2 2.4\times10^4$ 1/cm and for $v=1$ cm/sec., $v_B=2.4\times10^4$ Hz. The dependence of $v_B$ on range and velocity is shown in FIG. 3. FIG. 3 shows beat frequency versus velocity v and range $L_H$ for an external cavity head sensor.

There are several optical scanning configurations. In order to have one external cavity laser determine the range to 2 or 3 corner reflectors, two embodiments are feasible. Embodiment 10 is spatial modulation wherein spatial modulator 22 couples one corner reflector 14 to the cavity at a point in time, with time-shared operation for the other corner cubes 14. Spatial modulators 22 can be a rotating disk with an off-axis hole or a rotating wedge prism 24. Both of these devices require motor drive 38 and a limited resolution pick-off 37 providing sector information.

Figure 4:
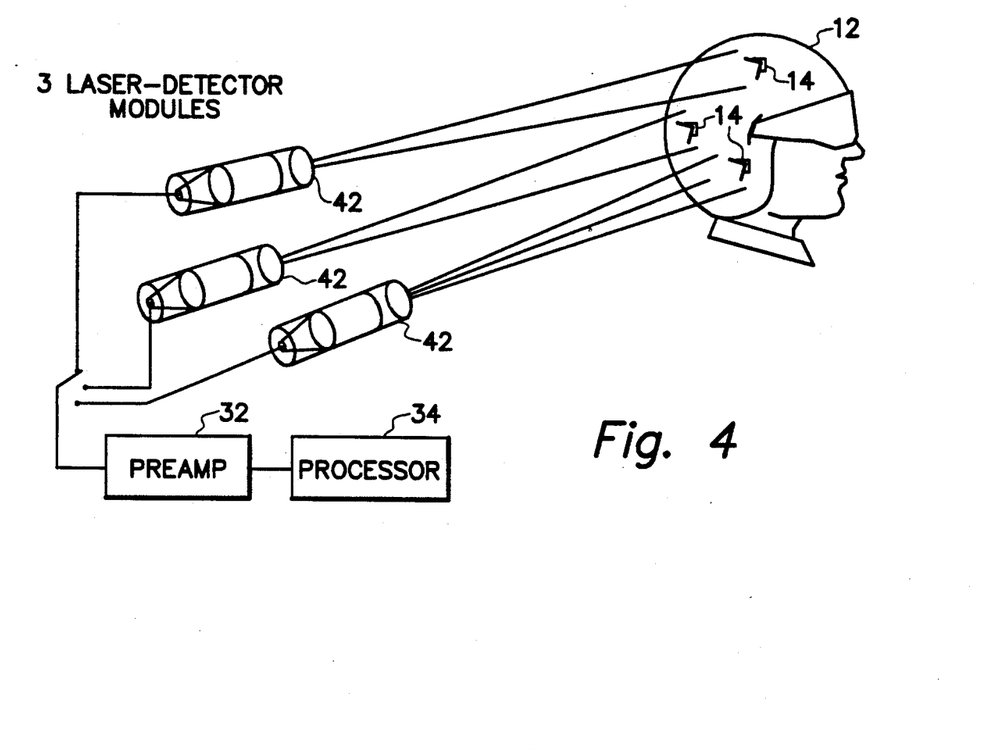
FIG. 4 illustrates individual staring transmitter/receiver modules.
Figure 5:
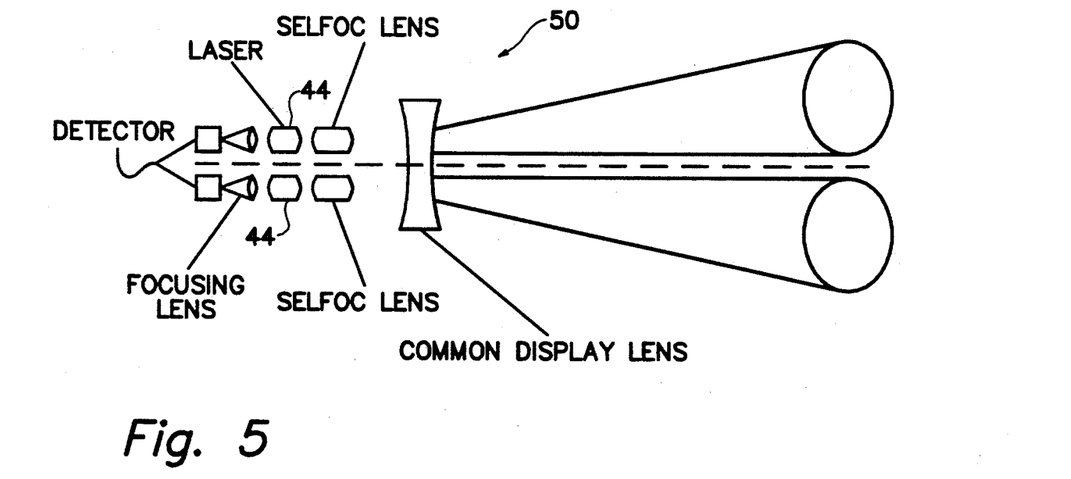
FIG. 5 shows multiple transmit/receive modules sharing one optical element.

Embodiment 40 is a multiple diode approach wherein, instead of scanning the corner reflector, two or three laser diodes 42 are arranged in one optical system such that each corner cube 14 within its motion box is illuminated all the time by one diode 16, yielding one range measurement all the time (in FIG. 4). FIG. 4 reveals individual staring transmitter/receiver modules. Or, two or three laser detector modules 44 can be mounted on one chip using one optical system 50, while the electronics can be shared using a switching network (in FIG. 5). FIG. 5 shows multiple transmit/receive modules sharing one optical element.

Figure 6A:
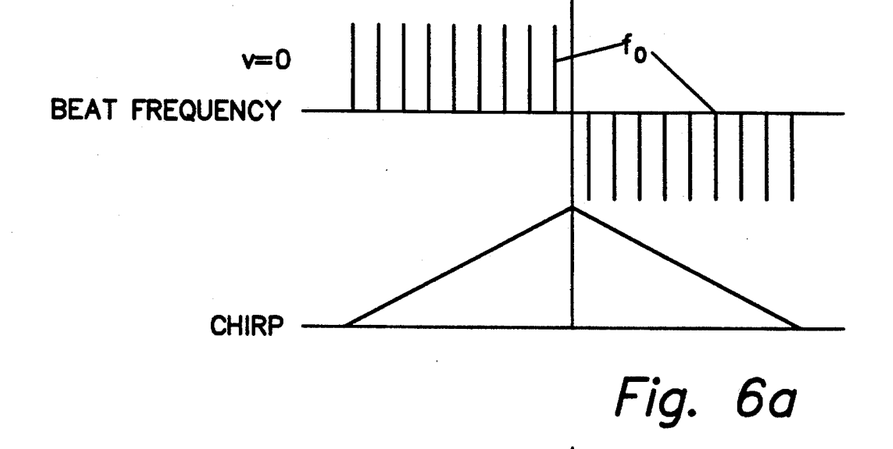
FIGS. 6a–6c indicate the effect of helmet motion on the laser beat frequency.
Figure 6B:
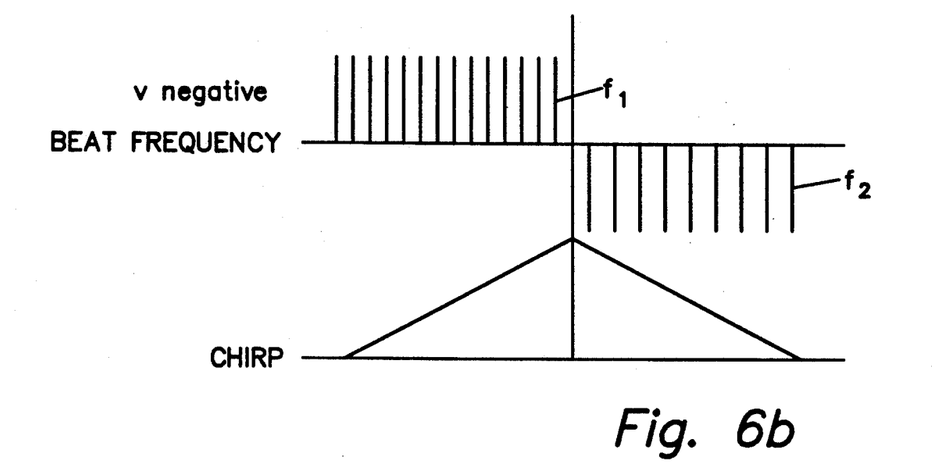
Figure 6C:
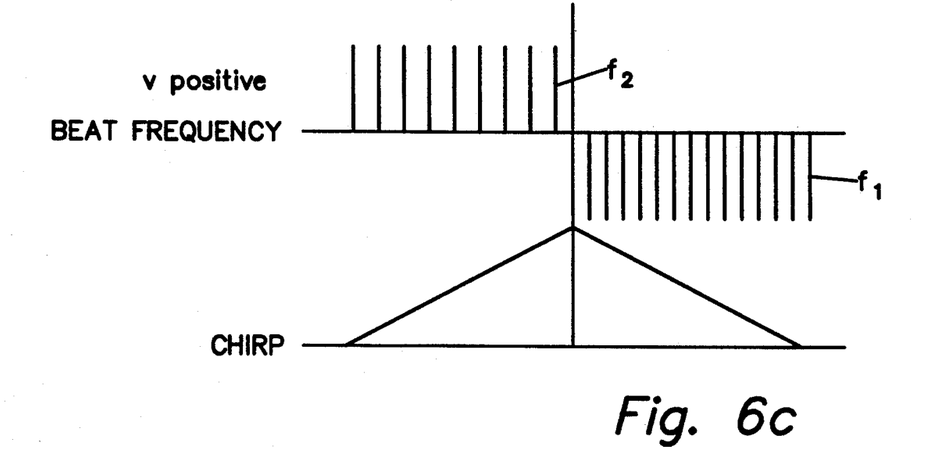

Range measurement may be had without sensitivity to velocity. As the beat frequency equation shows, the beat frequency obtained is proportional to range but also contains a term due to velocity. FIGS. 6a-6c indicate the influence of helmet motion on beat frequency. Note that $$f_o = \frac{f_1 + f_2}{2}$$

independent of velocity. If a symmetric ramp is used for up- and down-chirping the laser frequency (as shown in FIGS. 6a-6c) for the case of no velocity, a beat frequency is obtained which for the up-chirp cycle is identical to the beat frequency for the down-chirp cycle (in FIG. 6a). If, however, a negative velocity arises (in FIG. 6b) (velocity vector opposite the positive sensing direction), the beat frequency for the up-chirp cycle increases while the beat frequency for the down-chirp cycle decreases. If a positive velocity is encountered (velocity vector in positive sensing direction), the beat frequency for the up-chirp cycle is reduced, while the beat frequency for the down-chirp cycle is increased (in FIG. 6c). Thus, a velocity independent beat signal is obtained by forming $$v = \frac{v_{up} + v_{down}}{2}.$$

Further, the beat frequency which is only due to range and independent of velocity can be derived by keeping $dv/dt=$constant. Then one has $$\frac{dL_H}{dt} = \frac{c}{2} \cdot \frac{\left(\frac{dv_B}{dt}\right)}{\left(\frac{dv}{dt}\right)} \text{ or } \Delta L_H = \frac{c}{2} \cdot \frac{(\Delta v_B)}{\left(\frac{dv}{dt}\right)}$$

Figure 2:
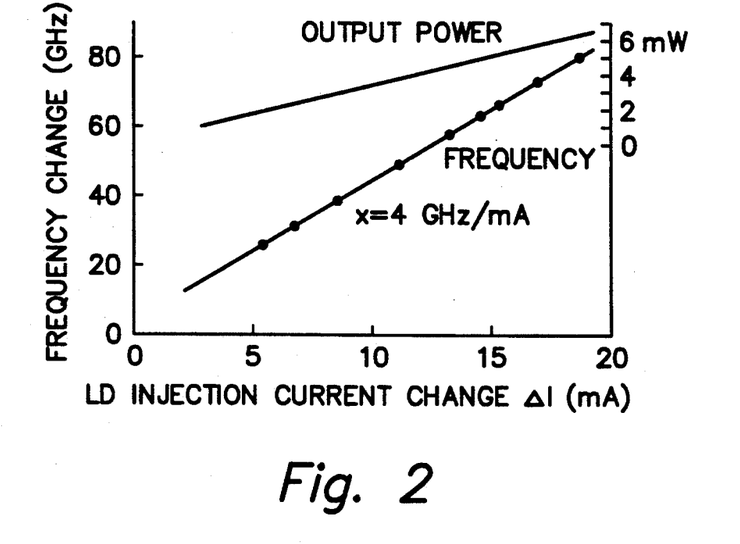
FIG. 2 is a graph of diode injection current change versus frequency change.
Figure 7:
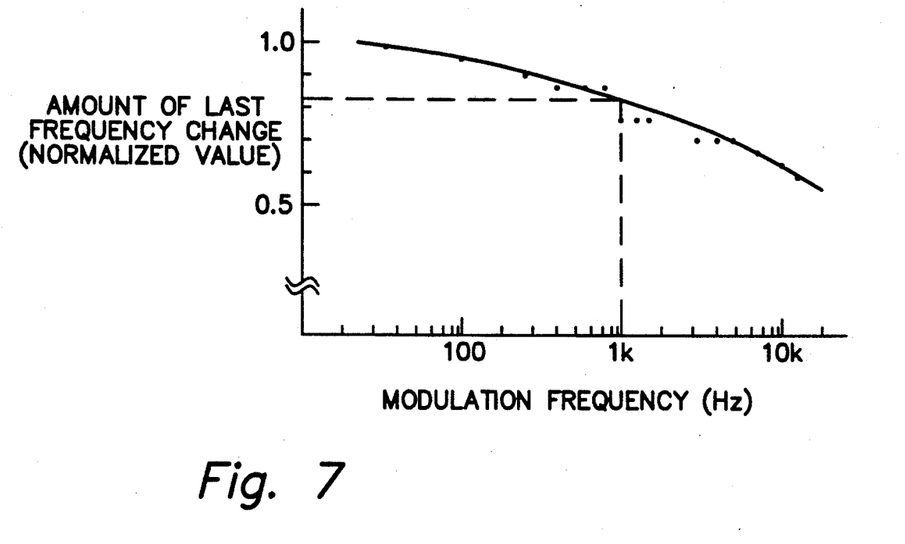
FIG. 7 is a graph of laser frequency response versus modulation frequency.

For instance, for a Hitachi diode the frequency shift is 4 GHz/mA (in FIG. 2). If the modulation frequency is 1 kHz, this number is to be multiplied by 0.83 (in FIG. 7). FIG. 7 is graphing of frequency response of laser frequency tuning measured as a function of modulation frequency of the diode current. Thus, the chirp rate can be obtained.

$$\frac{d\nu}{dt} = \frac{4 \text{ GHz} \times 0.83}{\text{mA}} \times \frac{1 \text{ mA}}{10^{-3} \text{ sec}} = 3.3 \times 10^{12} \frac{1}{\text{sec}^2},$$

$$L_H = 20 \text{ cm and}$$

$$\nu_B = \frac{2 \times 20}{3 \times 10^{10}} \times 3.3 \times 10^{12} = 4.4 \times 10^3 \text{ Hz}.$$

A frequency measurement accuracy of 1 part in $10^4 = 0.44$ Hz can be achieved in a straightforward manner. The equivalent range accuracy is $$\Delta L_H = \frac{3 \times 10^{10}}{2} \times \frac{0.44}{3.3 \times 10^{12}} = 0.02 \text{ mm}.$$

The influence of changes in $d\nu/dt$ are to the first order not directly contributing to the range error since $\Delta f$ is directly proportional to $d\nu/dt$ and since in the error equation the ratio of the two enters into the equation (neglecting again $d^2\nu/dt^2$ as small). Thus, the achievable ranging accuracy is sufficient for helmet sight measurements and can be achieved with state-of the-art components.

Figure 8:
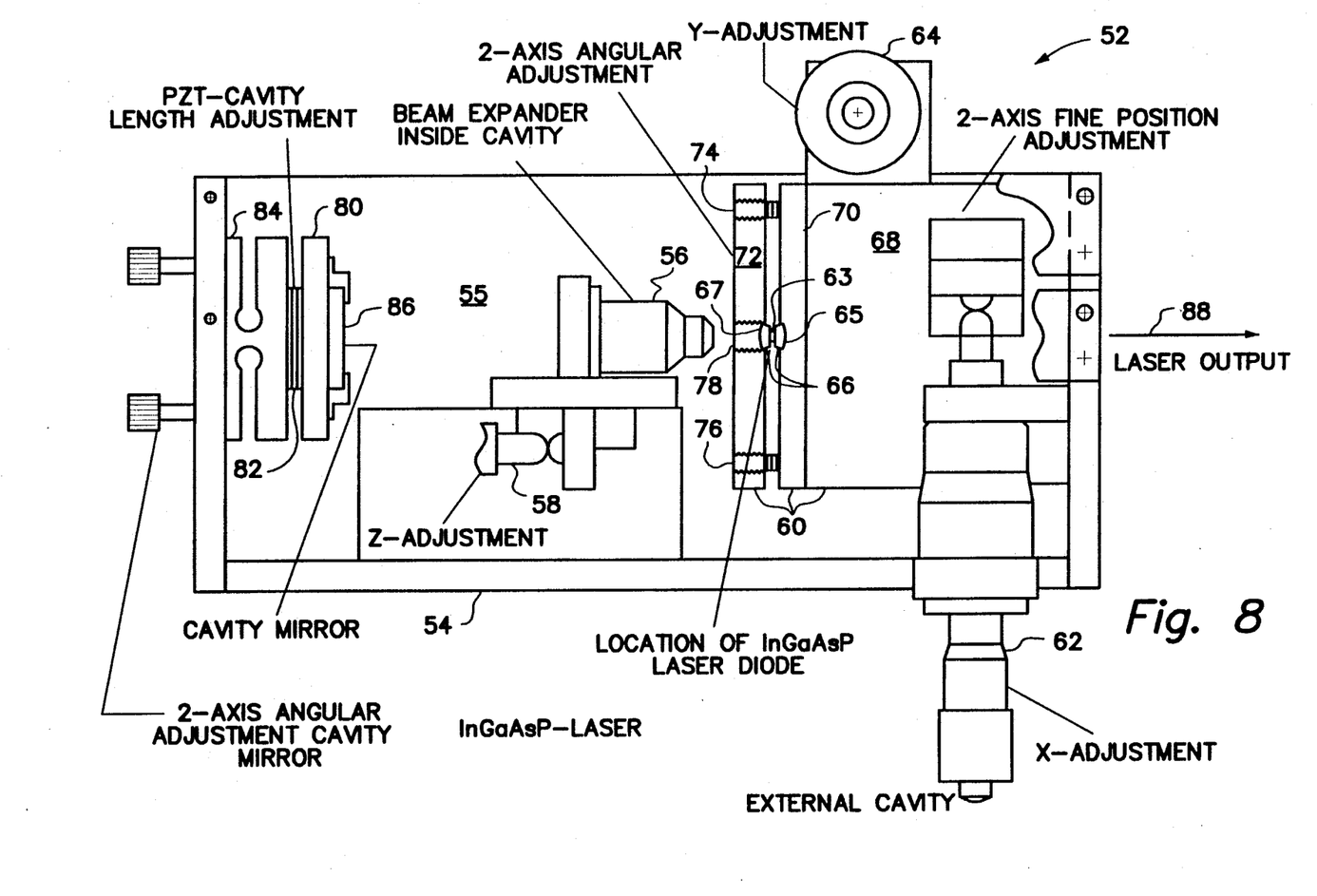
FIG. 8 is a drawing of an external cavity InGaAsP laser.

The system 10 or 40 laser or lasers may be a miniaturized, external cavity InGaAsP laser 52 (in FIG. 8) that produces a 1.54 micrometer (μm) wavelength light beam. Laser 52 is frequency stable with a line width of 40 kilohertz (kHz). Laser 52 is a continuous wave device. The line width of laser 52 is an improvement of about four orders of magnitude over the line width of a corresponding solitary laser diode. In FIG. 8, external cavity laser 52 has a stable cavity 54 constructed of invar for thermal stability and acoustic isolation. Cavity 54 holds in a concentric fashion an optical beam expander 56 which has a fine adjustment 58 for the Z position. The front end of cavity 54 houses two-axis adjustment 60 having a two-axis trapezoidal fine position adjustment, and X-adjustment 62 and a Y-adjustment 64, for InGaAsP diode chip 66. InGaAsP chip 66 is mounted so as to receive cooling from Peltier electric cooler 70 mounted on block 68. Invar slab 72 is mounted so as to have two-axis angular adjustments 74 and 76. Also center threaded holder 78 provides for fine adjustment of diode 66 in the Z axis.

Rear reflector-grating or mirror holder 80 is mounted on piezoelectric transducer (PZT) element 82. Holder 80 holds cavity mirror 86 in cavity 52. PZT element 82 provides a one-time phase adjustment for the phase of the optical wave of the external feedback cavity to be "in-phase" with the optical wave in the solitary diode. PZT element 82 is mounted on two-axis angular adjustment element 84 which in turn is end-mounted in invar cavity 52.

Figure 9:
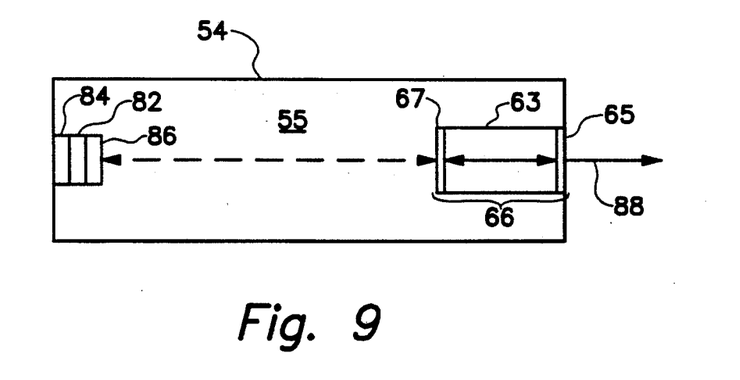
FIG. 9 sets forth the basic relationship between the passive external cavity and the active internal cavity.

Chip 66, in FIG. 9, functions as an active internal cavity 63 for the laser light. The typical length of the internal cavity 63 is about 0.02 centimeter. Laser light is emitted from the laser diode through a partially reflective coating 67 situated at one end of the solitary diode. The emitted laser light goes through space 55 of passive external cavity 54 of about 10 centimeters in length, to a fully reflective cavity mirror 86. The laser light is reflected back through mirror 67 into laser diode 63. The laser light reflected back into cavity 63 is of a very stable frequency and is in phase with the laser light of internal cavity 63. The laser light coming from space 55 of cavity 54 provides wave reinforcement or constructive interference amounting to strong feedback of resonant external cavity space 55 to the oscillation frequency of laser diode 63. From diode 63 through partially (i.e., about 40%) reflecting mirror 65 exits narrow line width laser 88. Mirror 67 is partially reflective so as to reflect some of the laser back within the respective cavities 54 and 63. Mirror 65 is similarly partially reflective so as to reflect some of the laser light back within diode 63.

In lieu of external cavity InGaAsP laser 52, a diode-pumped Nd:YAG laser which is well known in the art may be utilized.

Invention can be developed into a sensor requiring no moving parts,and thus having a high reliability. The need for laser diode modulation and the processing techniques are state-of-the-art. The flood light embodiment 10 can be used if corner reflectors 14 are modulated at low frequencies. Recently ferro-electric liquid crystals have become available that have a transmission range from 400–1500 nm and would be suitable for this application.

We claim:

1. An object position and orientation determining system comprising:
   light source;
   modulating means connected to the light source for modulating the frequency of a light beam emitted from the light source;
   spatial modulating means for spatially modulating the light beam;
   a plurality of reflectors positioned on an object in predetermined positions;
   a detector for detecting an associated beat frequency in a mixture of the light beam and reflected light from each of the reflectors, wherein the beat frequency is proportional to the distance to its associated reflector; and
   processing means connected to the detector and the spatial modulating means for determining the position and orientation of the object.

2. The system of claim 1 wherein the light source is a laser.

3. The system of claim 1 wherein the spatial modulating means in an opaque solid body with an opening that passes through the body and the opening rotates in space relative to said light source.

4. The spatial modulating means of claim 3 wherein the opaque solid body is a disk.

5. The system of claim 1 wherein the spatial modulating means is a translucent rotating cylinder comprised of at least three wedge prisms.

6. The system of claim 1 wherein the object is a helmet.

7. The system of claim 1 wherein the detector detects a Doppler shift frequency in the mixture of the light beam and the light reflected from the reflectors, wherein the Dopler shift frequency is proportional to the relative velocity of each of the reflectors.

8. The system of claim 1 wherein the processor determines the relative velocity of the object.

9. The object position and orientation determining system of claim 1 wherein the modulating means comprises a modulator connected to a power source.

10. An object position and orientation determining system comprising:

N light sources;

modulating means connected to the N light sources for modulating the frequency of a light beam emitted from the N light sources;

N reflectors positioned on an object in predetermined positions;

N detectors for detecting an associated beat frequency in a mixture of the light beam and reflected light from each of the N reflectors, wherein the beat frequency is proportional to the distance to its associated reflector; and processing means connected to the N detectors for determining the position and orientation of the object.

11. The system of claim 10 wherein the N light sources are lasers.

12. The system of claim 10 wherein the object is a helmet.

13. The system of claim 10 wherein the detectors detect the Doppler shift frequency in the mixture of the light beam and the light reflected from the reflectors, wherein the Doppler shift frequency is relative to velocity of each of the reflectors.

14. The system of claim 10 wherein the processor determines the relative velocity of the object.

15. The object position and orientation determining system of claim 10 wherein the modulating means comprises a modulator connected to a power source.

* * * * *

UNITED STATES PATENT AND TRADEMARK OFFICE
CERTIFICATE OF CORRECTION

PATENT NO. : 5,208,641
DATED : 4 MAY 1994
INVENTOR(S) : HANS W. MOCKER, JOHN C. OVERLAND

It is certified that error appears in the above-indentified patent and that said Letters Patent is hereby corrected as shown below:

In column 3, between lines 47 and 50, delete:

"Beat Frequency $v_B = \dfrac{2v}{\lambda} + \dfrac{2L_H}{c} \cdot \dfrac{dv}{dt}$ " and insert --Beat Frequency $v_B = \dfrac{2v}{\lambda} + \dfrac{2L_H}{c} \cdot \dfrac{dv}{dt}$ --

In column 3, line 51 delete "$\Delta v$" and insert --$v$--

In column 3, line 62 delete:

"$v_B 2 L_H / c \cdot dv / dt = K_1$" and insert

--$v_B = L_H / c \cdot dv / dt = K_1$ --

Signed and Sealed this

Twenty-first Day of June, 1994

Attest:

BRUCE LEHMAN

*Attesting Officer*       Commissioner of Patents and Trademarks